(12) United States Patent
Stelzer

(10) Patent No.: US 12,007,653 B2
(45) Date of Patent: Jun. 11, 2024

(54) GLAZING UNIT WITH ELECTRICALLY CONTROLLABLE OPTICAL PROPERTIES HAVING A PLURALITY OF INDEPENDENT SWITCHING REGIONS

(71) Applicant: SAINT-GOBAIN GLASS FRANCE, Courbevoie (FR)

(72) Inventor: Richard Stelzer, Düsseldorf (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 18/263,283

(22) PCT Filed: Apr. 29, 2022

(86) PCT No.: PCT/EP2022/061469
§ 371 (c)(1),
(2) Date: Jul. 27, 2023

(87) PCT Pub. No.: WO2022/243009
PCT Pub. Date: Nov. 24, 2022

(65) Prior Publication Data
US 2024/0103321 A1 Mar. 28, 2024

(30) Foreign Application Priority Data

May 18, 2021 (EP) ..................... 21174346

(51) Int. Cl.
*G02F 1/1343* (2006.01)
*B32B 17/10* (2006.01)
(Continued)

(52) U.S. Cl.
CPC .. *G02F 1/134309* (2013.01); *B32B 17/10036* (2013.01); *B32B 17/10192* (2013.01);
(Continued)

(58) Field of Classification Search
None
See application file for complete search history.

(56) References Cited

U.S. PATENT DOCUMENTS

| 6,056,861 A * | 5/2000 | Fuhr ..................... C12M 33/00 |
| | | 204/600 |
| 2012/0026573 A1 | 2/2012 | Collins et al. |

(Continued)

FOREIGN PATENT DOCUMENTS

| DE | 100 43 141 A1 | 3/2002 |
| DE | 10 2005 007427 A1 | 8/2006 |

(Continued)

OTHER PUBLICATIONS

International Search Report as issued in International Patent Application No. PCT/EP2022/061469, dated Aug. 19, 2022.

*Primary Examiner* — Ryan Crockett
(74) *Attorney, Agent, or Firm* — Pillsbury Winthrop Shaw Pittman LLP

(57) ABSTRACT

A glazing unit with electrically controllable optical properties having multiple independent switching regions includes a laminated glass pane with an electrically controllable functional element and a control unit to control the optical properties of the functional element. The functional element has an active layer with electrically controllable optical properties between a first planar electrode and a second planar electrode. The first planar electrode is subdivided by at least one insulation line into at least two separate electrode segments, wherein a voltage is applicable independently between each electrode segment of the first planar electrode and the second planar electrode in order to control the optical properties of the section of the active layer located between them. The control unit is adapted to apply an AC voltage between at least two electrode segments of the first (Continued)

planar electrode and the second planar electrode, wherein the AC voltages are phase-shifted.

16 Claims, 4 Drawing Sheets

(51) Int. Cl.
    *B60J 3/04*     (2006.01)
    *G02F 1/1334*     (2006.01)
(52) U.S. Cl.
    CPC .... *B32B 17/1022* (2013.01); *B32B 17/10348* (2013.01); *B32B 17/10504* (2013.01); *B32B 17/10532* (2013.01); *B32B 17/10761* (2013.01); *B60J 3/04* (2013.01); *G02F 1/1334* (2013.01); *B32B 2605/00* (2013.01); *G02F 1/13439* (2013.01)

(56) References Cited

U.S. PATENT DOCUMENTS

| | | | |
|---|---|---|---|
| 2018/0113297 A1* | 4/2018 | Desai | G02B 1/18 |
| 2018/0264526 A1* | 9/2018 | Kim | B01L 3/502792 |
| 2019/0041668 A1* | 2/2019 | Neic | G05F 1/12 |
| 2021/0379968 A1* | 12/2021 | Do Rosario | B32B 17/10761 |
| 2022/0100011 A1* | 3/2022 | Droste | B32B 17/10036 |
| 2023/0384580 A1* | 11/2023 | Balili | G02B 26/005 |

FOREIGN PATENT DOCUMENTS

| | | |
|---|---|---|
| DE | 10 2005 049081 B3 | 6/2007 |
| DE | 10 2007 027296 A1 | 12/2008 |
| DE | 10 2008 060040 A1 | 11/2009 |
| DE | 10 2008 026339 A1 | 12/2009 |
| DE | 10 2010 056203 A1 | 2/2012 |
| DE | 10 2013 001334 A1 | 7/2014 |
| DE | 10 2017 213291 B3 | 10/2018 |
| EP | 0 876 608 B1 | 4/2002 |
| EP | 1 862 849 A1 | 12/2007 |
| EP | 3 456 913 A1 | 3/2019 |
| KR | 102152644 B1 * | 9/2020 |
| WO | WO 2010/147494 A1 | 12/2010 |
| WO | WO 2011/033313 A1 | 3/2011 |
| WO | WO 2012/007334 A1 | 1/2012 |
| WO | WO 2014/072137 A1 | 5/2014 |
| WO | WO 2017/157626 A1 | 9/2017 |
| WO | WO 2020/083562 A1 | 4/2020 |
| WO | WO 2020/152075 A1 | 7/2020 |

* cited by examiner

GLAZING UNIT WITH ELECTRICALLY CONTROLLABLE OPTICAL PROPERTIES HAVING A PLURALITY OF INDEPENDENT SWITCHING REGIONS

CROSS-REFERENCE TO RELATED APPLICATIONS

This application is the U.S. National Stage of PCT/EP2022/061469, filed Apr. 29, 2022, which in turn claims priority to European patent application number 21174346.3 filed May 18, 2021. The content of these applications are incorporated herein by reference in their entireties.

The invention relates to a glazing unit with electrically controllable optical properties, to the use thereof and to a method for the control thereof.

Glazing units with electrically controllable optical properties are known as such. They comprise laminated glass panes equipped with functional elements whose optical properties can be changed by an applied voltage. The voltage is applied via a control unit which is connected to two planar electrodes of the functional element, between which the active layer of the functional element is located. An example of such functional elements are SPD (suspended particle device) functional elements, which are known, for example, from EP 0876608 B1 and WO 2011033313 A1. By applying voltage, the transmission of visible light can be controlled by SPD functional elements. Another example are PDLC (polymer-dispersed liquid crystal) functional elements, which are known, for example, from DE 102008026339 A1. The active layer contains liquid crystals which are embedded in a polymer matrix. If no voltage is applied, the liquid crystals will be aligned in a unordered manner, which results in strong scattering of the light passing through the active layer. If a voltage is applied to the planar electrodes, the liquid crystals will align in a common direction and the transmission of light through the active layer is increased. The PDLC functional element operates primarily by increasing the scattering instead of by reducing the total transmission, as a result of which a clear view can be prevented or anti-glare protection can be ensured. In addition, electrochromic functional elements are known, for example from US 20120026573 A1, WO 2010147494 A1 and EP 1862849 A1 and WO 2012007334 A1, in which a change in transmission is the result of electrochemical processes which is induced by the applied electrical voltage.

Such glazing units can be used, for example, as vehicle window panes, whose light transmission behavior can then be controlled electrically. They can be used, for example, as roof panels to reduce exposure to direct sunlight or disruptive reflections. Such roof panels are known, for example, from DE 10043141 A1 and EP 3456913 A1. Windshields have also been proposed in which an electrically controllable sun screen is realized by a switchable functional element in order to replace the conventional mechanically foldable sun screen in motor vehicles. Windshields with electrically controllable sun screens are known, for example, from DE 102013001334 A1, DE 102005049081 B3, DE 102005007427 A1 and DE 102007027296 A1.

It is also known to provide such glazing unit or the switchable functional elements with a plurality of switching regions, the optical properties of which can be switched independently of one another. For example, one region of the functional element can be selectively darkened or provided with a high level of light scattering, while other regions remain transparent. Glazing units with independent switching regions and a method for their production are known, for example, from WO 2014072137 A1. Reference is further made to WO 2017157626 A1 and to WO 2020083562 A1.

The independent switching regions are typically formed by one of the planar electrodes being subdivided by insulation lines into regions (segments) which are separated from one another and are each connected independently of one another to the control unit and which can therefore be controlled independently, while the other planar electrode does not have any insulation lines. The insulation lines are typically introduced into the planar electrode by laser machining. The planar electrodes cannot be selected with respect to optimal electrical conductivity, since they must be transparent to ensure transparency of the laminated glass pane. Typically used as planar electrodes are ITO layers which have comparatively low conductivity or a comparatively high electrical resistance. This results in a problem when a voltage is applied to only some of the switching regions. The voltage results in a current flow through the active layer in the respective switching region, which in turn leads to a shift of potential in the non-segmented planar electrode due to the latter's electrical resistance. This effect is also referred to as ground shift. As a result, a certain voltage is now also generated in those switching regions which are actually not to be switched, which then likewise change their optical properties to a certain extent without this being desired. This effect is also referred to as crosstalk between the switching regions. Crosstalk is problematic in particular because switching regions which are not intended to be activated and therefore intended to be voltage-free are typically switched to the connection potential of the non-segmented planar electrode (reference potential, "ground"), in order, on the one hand, to ensure a rapid discharge of the individual segments in the case of their disconnection and, on the other hand, to avoid an influence of so-called "dirt resistances" (undesired electrical connections due to dust or moisture). As a result, a closed current circuit is formed by all switching regions.

Ground shift is the more pronounced the greater the number of activated switching regions, i.e., the greater the number of switching regions exposed to an intentional voltage. For this reason, crosstalk has a disruptive effect in particular in the case of a large number of activated switching regions.

In principle, it would be possible to prevent crosstalk by segmenting the second planar electrode as well by insulation lines in accordance with the switching regions. However, if both planar electrodes are to be segmented in one processing step, strong laser radiation is required which reduces the aesthetic appearance of the laminated glass pane, for example as a result of burning effects. If, as an alternative, the two planar electrodes are individually segmented, it is difficult to bring the insulation lines of the two planar electrodes into precise congruence. In addition, "double" insulation lines in both planar electrodes are always more conspicuous visually than insulation lines in only one planar electrode, even when they are arranged perfectly congruently.

DE 102017213291 B3 discloses a control unit for a glazing unit having electrically controllable optical properties which has a plurality of isolated circuit sections which can be operated in a phase-shifted manner. DE 102010056203 A1 also discloses a control unit for a glazing unit with electrically controllable optical properties. The above-described ground shift problem and the resulting crosstalk between different switching regions are neither discussed in these publications nor is a solution proposed.

There is therefore a need for improved glazing units with electrically controllable optical properties having a plurality of independent switching regions in which the crosstalk effect between activated and non-activated switching regions is prevented or at least significantly reduced. The object of the present invention is to provide such an improved glazing unit and a method for the control thereof.

The object is achieved according to the invention by a glazing unit with electrically controllable optical properties having a plurality of independent switching regions and which comprises a laminated glass pane and a control unit. The laminated glass pane comprises an outer pane and an inner pane, which are connected to one another via a thermoplastic intermediate layer, and an electrically controllable functional element arranged between the outer pane and the inner pane. The functional element has an active layer with electrically controllable optical properties between a first planar electrode and a second planar electrode. The control unit is suitable for controlling the optical properties of the functional element. The first planar electrode is subdivided into at least two separate electrode segments by at least one insulation line. Each electrode segment of the first planar electrode and the second planar electrode are electrically connected to the control unit, so that an AC voltage can be applied independently between each electrode segment of the first planar electrode and the second planar electrode in order to control the optical properties of the section of the active layer located between them.

According to the invention, the control unit is suitable for applying an AC voltage between, on the one hand, at least two electrode segments of the first planar electrode and, on the other hand, of the second planar electrode, wherein the AC voltages are phase-shifted (have a phase shift relative to one another). Suitability of the control unit is expressed in particular in that software is stored which regulates the control according to the invention of the AC voltages and in that it has the required hardware components to store the software and execute it as intended. Software control is technically easy to realize and therefore preferred. Alternatively, the AC voltages can also be controlled purely by suitable hardware components. Suitability is then expressed in correspondingly designed hardware components. The control unit is designed in particular to apply an AC voltage between at least two electrode segments of the first planar electrode, on the one hand, and the second planar electrode, on the other hand, wherein the AC voltages are phase-shifted. The control unit is configured accordingly and the glazing unit is operated in this manner.

The object is also achieved by a method for controlling a glazing unit according to the invention with electrically controllable optical properties having a plurality of independent switching regions. The method according to the invention is characterized in that an AC voltage is applied in each case between, on the one hand, at least two electrode segments of the first planar electrode and, on the other hand, of the second planar electrode, wherein the AC voltages are phase-shifted relative to one another.

The glazing unit and the method are described together below, wherein explanations and preferred embodiments relate equally to glazing unit and method. If preferred features are described in connection with the method, this means that the glazing unit is preferably designed and is suitable accordingly. If, on the other hand, preferred features are described in connection with the glazing unit, this means that the method is also preferably carried out accordingly.

The invention is based on the finding that the disruptive crosstalk effect—that is, the phenomenon that a switching state of activated switching regions emanates as it were onto other, actually voltage-free switching regions—is caused by a shift in the potential of the reference potential of the second planar electrode as a result of a current flow in the activated switching regions. The core of the invention is now to operate the activated switching regions with a phase-shifted AC voltage, so that this shift in potential is completely or at least partially compensated by counter-currents. The undesired switching of actually non-activated switching regions can thus be prevented or at least reduced. The solution according to the invention is also comparatively easy to realize because the phases of the AC voltages can be determined solely by the control unit and no structural changes have to be made to the laminated glass pane. These are great advantages of the invention.

The laminated glass pane according to the invention comprises at least one outer pane and one inner pane which are connected to one another via a thermoplastic intermediate layer. The laminated glass pane is provided for separating the interior space from the external environment in a window opening (in particular a window opening of a vehicle, but alternatively also a window opening of a building or a room). In the context of the invention, the term "inner pane" is understood to mean the pane facing the interior space. Outer pane means the pane facing the external environment. The outer pane and the inner pane each have an outer surface and an interior-side surface and a circumferential side edge surface extending between them. In the context of the invention, the outer surface means the main surface which is provided to face the external environment when installed. In the context of the invention, the interior-side surface means the main surface which is intended to face the interior space when installed. The interior-side surface of the outer pane and the outer surface of the inner pane face one another and are connected to one another by the thermoplastic intermediate layer.

The laminated glass pane according to the invention contains a functional element with electrically controllable optical properties which is arranged between the outer pane and the inner pane, i.e., is embedded in the intermediate layer. The functional element is preferably arranged between at least two layers of thermoplastic material of the intermediate layer, wherein it is connected to the outer pane by the first layer and to the inner pane by the second layer. Alternatively, however, the functional element can also be arranged directly on the surface of the outer pane or of the inner pane facing the intermediate layer. Preferably, the side edge of the functional element is completely surrounded by the intermediate layer, so that the functional element does not extend all the way to the side edge of the laminated glass pane and therefore has no contact with the surrounding atmosphere.

The functional element comprises at least one active layer and two planar electrodes which are arranged on both sides of the active layer so that the active layer is arranged between the planar electrodes. The planar electrodes and the active layer are typically arranged essentially parallel to the surfaces of the outer pane and the inner pane. The active layer has the variable optical properties which can be controlled by a voltage applied to the active layer via the planar electrodes. In the context of the invention, electrically controllable optical properties are understood, in particular, to mean such properties which are continuously controllable. In the context of the invention, the switching state of the functional element means the extent to which the optical properties are changed compared to the voltage-free state. A 0% switching state corresponds to the voltage-free state while a 100% switching state corresponds to the maximum change in optical properties. Between the two aforementioned states, all switching states can be continuously realized by selecting the voltage accordingly. A 20% switching state corresponds, for example, to a change in the optical properties by 20% of the maximum change. Said optical properties relate in particular to the light transmission and/or the scattering behavior.

In principle, however, it is also conceivable that the electrically controllable optical properties can only be switched between two discrete states. In that case, only two switching states exist—namely 0% and 100%. It is also conceivable that the electrically controllable optical properties can be switched between more than two discrete states.

The planar electrodes are preferably transparent, which in the context of the invention means that they have a light transmittance in the visible spectral range of at least 50%, preferably at least 70%, particularly preferably at least 80%. The planar electrodes preferably contain at least one metal, a metal alloy or a transparent conducting oxide (TCO). The planar electrodes can be formed, for example, on the basis of silver, gold, copper, nickel, chromium, tungsten, indium tin oxide (ITO), gallium-doped or aluminum-doped zinc oxide and/or fluorine-doped or antimony-doped tin oxide, preferably on the basis of silver or ITO. The planar electrodes preferably have a thickness of 10 nm to 2 µm, particularly preferably of 20 nm to 1 µm, very particularly preferably of 30 nm to 500 nm.

According to the invention, the first planar electrode has at least two segments (electrode segments) which are separated from one another by an insulation line. The insulation line is understood to mean a line-like region in which the material of the planar electrode is not present, so that the adjacent segments are materially separated from one another and are therefore electrically insulated from one another. This means that there is no direct electrical connection between the electrode segments, but the electrode segments can be connected to one another indirectly to a certain extent in an electrically conductive manner via the active layer in contact with them. The first planar electrode can be subdivided into several segments by several insulation lines. Each electrode segment forms a switching region of the glazing arrangement. The number of electrode segments can be freely selected by the person skilled in the art as needed on an individual basis. In a preferred embodiment, the insulation lines run substantially parallel to one another and extend from a side edge of the planar electrode to the opposite side edge. However, any other geometric shapes are also conceivable.

In an advantageous embodiment, the first planar electrode has at least three electrode segments, which are separated from one another by an insulation line in each case. For this reason, there will be a total of at least two insulation lines, and the glazing unit will have at least three independent switching regions. Glazing units with only two switching regions can also be operated without problems according to the inventive principle with phase-shifted AC voltage. However, since there is no further switching region which can have a 0% switching state and on which the crosstalk effect could have a disruptive effect, the invention does not develop its full potential in this case. For the same reason, the method according to the invention is particularly advantageous in a situation in which not all switching regions are activated, but in which at least two switching regions have a switching state greater than 0% and at least one switching region has a nominal switching state of 0%.

However, the invention can also be used for such glazing units as have only two independent switching regions. Likewise the method can also be applied when two or more switching regions are present, wherein all switching regions are activated, i.e., have a switching state greater than 0%. In particular, the precision of a switching state can be improved depending on the situation. Aside from the particularly disruptive crosstalk, i.e., the undesired switching of actually non-activated switching regions, the shift in the potential of the second planar electrode has a further negative effect: since the voltage amount, i.e., the difference between the switching potential of the first planar electrode and the reference potential of the second planar electrode, deviates from the value set by the user due to the shift in potential, the desired switching state is sometimes not set precisely, i.e., the actual switching state deviates from the set switching state. This can have a disruptive effect in particular if the switching state is less than 100%, i.e., if the switching region is as it were "dimmed", because in this case a very precise adjustment of the voltage value is required. The invention can be thus used, for example, to improve the precision of a greater than 0% and less than 100% switching state of a switching region in that the contributions to the potential shifts of the second planar electrode caused by the remaining switching regions cancel each other out as a result of the phase shift.

The insulation lines have, for example, a width of 5 µm to 500 µm, in particular 20 µm to 200 µm. They are preferably introduced into the planar electrode by means of laser radiation. The width of the segments, i.e., the distance between adjacent insulation lines, can be suitably selected by the person skilled in the art according to the requirements in individual cases.

The second planar electrode and the active layer preferably each form a coherent, complete layer, which are not subdivided into segments by insulation lines. In principle, however, it is also conceivable that the second planar electrode is segmented to a lesser extent than is the first planar electrode, i.e., has fewer insulation lines and electrode segments, so that a plurality of electrode segments of the first planar electrode are assigned to at least one electrode segment of the second planar electrode. The crosstalk problem arises in this case too, but it can be reduced by the approach according to the invention. In this case, the technical teaching according to the invention relates to every segment of the second planar electrode with the electrode segments of the first planar electrode assigned to it irrespective of the others.

The electrode segments of the first planar electrode are electrically connected to the control unit independently of one another, so that a first electrical potential (which is variable over time in the case of an AC voltage) can be applied to each electrode segment (irrespective of the other electrode segments), which potential is referred to as switching potential in the context of the invention. The second planar electrode is also electrically connected to the control unit, so that, overall, a second electrical potential can be applied to the second planar electrode, which is referred to as reference potential (ground) in the context of the invention. If the first and the second potentials are identical, no voltage will be present between the electrodes in the respective switching region (0% switching state). If the first and the second potential are different, a voltage will be present between the electrodes in the respective switching region whereby a finite switching state is produced.

The control unit is provided and suitable for controlling the optical properties of the functional element. The control unit is electrically conductively connected, on the one hand, to the planar electrodes of the functional element and, on the other hand, to a voltage source. The voltage source provides a primary voltage. The control unit contains the electrical and/or electronic components required for applying the required voltage to the planar electrodes as a function of a switching state. The switching state can be predefined by the user (for example by operating a switch, a button or a rotary or sliding controller), can be determined by sensors and/or can be transmitted via a digital interface from the central control device of the vehicle (if the laminated glass pane is a vehicle window pane, usually a LIN bus or CAN bus). The switches, buttons, rotary or sliding controllers can be integrated, for example, in the dashboard of the vehicle if the laminated glass pane is a vehicle window pane. However, touch sensors can also be integrated directly into the laminated glass pane, for example capacitive or resistive sensors. Alternatively, the functional element can also be controlled by contactless methods, for example by recognizing gestures, or as a function of the state of pupil or eyelid determined by a camera and suitable evaluation electronics. The control unit can comprise, for example, electronic processors, voltage converters, transistors and other components.

According to the invention, the voltage applied to the planar electrodes is an AC voltage. In a preferred embodiment, the voltage source is a DC voltage source. The primary voltage is therefore a DC voltage. This situation obtains, for example, in a vehicle when the laminated glass pane is a vehicle window pane and the control unit is connected to the on-board voltage. The control unit is preferably connected to the on-board electrical system, from which it obtains the electrical voltage and optionally the information about the switching state. The control unit is then equipped with a plurality of inverters in order to convert the DC voltage into AC voltage. The number of inverters corresponds to at least the number of electrode segments of the first planar electrode, so that each electrode segment is assigned its own inverter. In this case, there is a one-to-one assignment of inverters and electrode segments: each electrode segment is connected to exactly one inverter and each inverter is connected to exactly one electrode segment. "Connected" means that the two components are electrically conductively connected to one another, so that an electrical potential can be transmitted to the electrode or the electrode segment.

If the primary voltage is sufficiently high for controlling the functional element, it can be converted directly into the AC voltage. However, since the on-board voltage of vehicles (for example 12 to 14 V) typically is not adequate for completely switching the functional element, the control unit will in addition preferably be equipped with a DC-DC converter which is suitable for increasing the supplied feed voltage (primary voltage), i.e., converting it into a higher secondary voltage (for example 65 V). The control unit is connected to the DC voltage source and is supplied with a primary voltage by the latter. The DC-DC converter converts the primary voltage into the higher secondary voltage. The inverters convert the secondary voltage into an AC voltage (for example effectively 48 V), for which they are suitable. The AC voltage is then applied, on the one hand, to the electrode segments of the first planar electrode and, on the other hand, to the second planar electrode.

In an advantageous embodiment, the secondary voltage is 65 V to 70 V, the AC voltage is 48 V to 50 V (effective voltage in each case). These values are to be understood as maximum values for achieving a 100% switching state. In order to realize a switching state of less than 100%, lower voltages are then naturally required.

According to the invention, the switching regions are supplied with an independent AC voltage, wherein the AC voltages of different switching regions can have a phase shift relative to one another. In an advantageous embodiment, this is realized in that the reference potential applied to the second planar electrode is constant over time. Each electrode segment of the first planar electrode is subjected to a temporally variable switching potential. For each switching region, the AC voltage arises as a temporally variable difference between switching potential and ground. The amount and phase of the AC voltage of the different switching regions can thus be set independently of one another by selecting the amount and phase of the respective switching potential.

The change over time of the switching potentials can be sinusoidal, rectangular or triangular, for example, as a result of which it results in a sinusoidal voltage, rectangular voltage or triangular voltage. Particularly preferably, the AC voltages used are sinusoidal voltages, i.e., the switching potentials are modulated in a sinusoidal manner. Sinusoidal voltages are particularly advantageous with regard to current consumption and electromagnetic compatibility.

The AC voltage which is independent for the individual switching regions can be realized in various ways. In a first preferred embodiment, the number of inverters corresponds to the number of electrode segments of the first planar electrode. Each inverter is connected, on the one hand, to exactly one electrode segment of the first planar electrode (electrically conductively connected thereto). On the other hand, each inverter is connected to the second planar electrode. In other words, each electrode segment of the first planar electrode is connected to a separate inverter, which is not connected to other electrode segments, and the second planar electrode is connected to all inverters. The reference potential which is applied by the inverters to the second planar electrode is preferably the same and constant over time for all inverters. The switching potentials, which are applied by the inverters to the different electrode segments of the first planar electrode, are variable over time and can have an amount and phase that are independent of one another. For example, the independent AC voltage according to the invention of the switching regions can be realized with the phase shift according to the invention.

In a second preferred embodiment, the number of inverters exceeds the number of electrode segments of the first planar electrode by 1. If the number of electrode segments is m, where m is a natural number, the number of inverters will thus be (m+1). Each electrode segment of the first planar electrode is connected to its own inverter (electrically conductively connected thereto), which is connected to none of the other electrode segments. The second planar electrode is also connected to its own inverter, which is connected to none of the electrode segments of the first planar electrode. In other words: each inverter is assigned to exactly one electrode segment or to exactly one electrode and is connected thereto, selected from the group consisting of the second planar electrode and all electrode segments of the first planar electrode. The reference potential which is applied by the inverter to the second planar electrode is preferably constant over time. The switching potentials, which are applied by the other inverters to the different electrode segments of the first planar electrode, are variable over time and can have an amount and phase that are independent of one another. For example, the independent AC voltage according to the invention of the switching regions can be realized with the phase shift according to the invention.

In the context of the invention, the said number of inverters of the control unit relates to the actually used inverters which are connected to the planar electrodes. In other words, the effective number of the switched inverters is meant. Of course, it is conceivable for the control unit to have further inverters which, however, are not connected to a planar electrode and therefore play no part in the switching process. For example, a control unit with a high number of inverters can thus be provided as a standard component, wherein, in this case, only the number of inverters which are required for the glazing unit in the specific application as a function of the number of its switching regions are used. It is then not necessary to design the control unit such as to match the specific application.

The functional element is preferably operated by the control unit in such a way that an electrical potential, which corresponds to the nominal potential of the second planar electrode, is applied to the electrode segments of the first planar electrode in those switching regions which are intended to have a 0% switching state. The unwanted crosstalk then occurs as a result of the described shift in potential of the second planar electrode (ground shift). With this type of switching, all switching regions form a closed circuit with the involvement of all electrode segments of the first planar electrode and the second planar electrode. It is advantageous with regard to a rapid switching behavior due to a rapid discharge of the individual switching regions. In addition, a disturbing influence of so-called "dirt resistances" (unwanted electrical connections due to dust or moisture) is avoided.

According to the invention, the shift in the potential of the reference potential (ground shift) due to countercurrents is to be prevented or reduced, wherein the countercurrents are effected by phase shifts of the AC voltages of the active switching regions (i.e., the switching regions in which a switching state greater than 0% is desired). This principle can be realized in different ways.

In a first preferred embodiment, the active switching regions are subdivided into two groups, each operated with an AC voltage of the same phase, wherein the AC voltages of the two groups have a 180° phase shift relative to one another. If the number of active switching regions is even, the two groups are selected to be the same size, so that the countercurrents are ideally compensated and the ground shift is avoided. This applies at least in those cases where the (total) switching states of the two groups are the same and therefore also the (total) amount of the AC voltages is the same. If a group has a higher voltage amount due to a higher switching state, an effective residual current will remain which is not compensated and, in turn, leads to a ground shift. However, this ground shift is much less pronounced than if all switching regions were operated with alternating current of the same phase. If the number of active switching regions is odd, the groups will be selected such that one group has exactly one more switching region than the other group. Assuming the same switching states and voltage amounts for all switching regions, the currents of all switching regions of the larger group are then compensated by the countercurrents of the switching regions of the smaller groups, except for exactly one. Although the non-compensated current of this one switching region of the larger group then results in an effective remaining ground shift, the said ground shift will be much less pronounced than if all switching regions were operated with alternating current of the same phase, i.e., the ground shift is reduced significantly.

For this reason, in the said first preferred embodiment an AC voltage is applied in each case between, on the one hand, n electrode segments of the first planar electrode and, on the other hand, the second planar electrode in order to produce a finite switching state greater than 0%. In this case, n is an integer greater than zero and corresponds to the number of active switching regions. The n electrode segments are the electrode segments of these active switching regions. If n is an even number, an AC voltage with a first phase will be applied between, on the one hand, n/2 electrode segments of the first planar electrode and, on the other hand, the second planar electrode. Likewise, an AC voltage with a second phase is applied between, on the one hand, the remaining n/2 electrode segments of the first planar electrode and, on the other hand, the second planar electrode. If n is an odd number, an AC voltage with a first phase will be applied between, on the one hand, (n+1)/2 electrode segments of the first planar electrode and, on the other hand, the second planar electrode. Likewise, an AC voltage with a (n−1)/2 second phase is applied between, on the one hand, the remaining electrode segments of the first planar electrode and, on the other hand, the second planar electrode. In both cases, the first phase and the second phase have a 180° phase shift.

The said 180° phase shift is optimal and results in a complete compensation of countercurrents. However, a significant improvement can be achieved even with slight deviations from this optimal value. The phase shift is preferably from 150° to 210°, particularly preferably from 160° to 200°, very particularly preferably from 170° to 190° and ideally 180°.

Strictly speaking, the above statements apply only in the case wherein all switching regions have the same size, because the voltage required for a specific switching state also depends on the size and geometry of the switching region. In typical application situations, this is at least approximately the case. If, on the other hand, the areas of the switching regions are very different, the groups can be subdivided differently in order to achieve the best possible compensation of the contributions to the ground shift according to the principle of the invention, wherein, for example, a plurality of smaller switching regions are combined in order to compensate for a larger switching region.

It is possible for the said groups of switching regions to be formed under software control by the control unit for each switching situation in such a way that the size of the groups complies with the rules described above. When the switching situation changes, for example as a result of a user input, the control unit will determine the number of switching regions to be activated and subdivide them into the groups in order to achieve a compensation of the current flows and thereby a prevention or reduction of the potential shift of the second planar electrode. However, since in typical application situations adjacent switching regions are usually activated, the switching regions can alternatively be permanently subdivided into the said groups from the outset, and a fixed phase can be assigned to the electrode segments. This applies in particular in the case whereby the electrode segments extend from one side edge of the functional element to the opposite side edge and are arranged essentially parallel to one another. If, for example, the functional element forms an electrically controllable sun screen of a windshield, the user will usually shade a continuous region of the functional element which borders the side edge of the functional element facing the upper edge of the windshield, or will provide it with a high degree of light scattering, the amount of which will depend on the position of the sun. The functional element is then subdivided into a first continuous region adjoining the side edge facing the upper edge, which region is formed by activated switching regions adjacent to one another, and a second continuous region adjoining the side edge facing away from the upper edge, which region is formed by non-activated switching regions adjacent to one another. A similar situation is given, for example, in case of a roof panel which has switching regions each running between the side edges of the roof panels and having a different distance from the front edge or rear edge. Here too, a first continuous region will typically be present as a function of the position of the sun, which region faces the front edge of the roof panel and is formed by activated (or non-activated) switching regions adjacent to one another, and a second continuous region which faces the rear edge of the roof panel and is formed by non-activated (or activated) switching regions adjacent to one another. It is therefore possible to assign a fixed phase of the AC voltage to each electrode segment of the first planar electrode, wherein the AC voltages of adjacent electrode segments (or switching regions) are each phase-shifted by 180°. The AC voltages between, on the one hand, directly adjacent electrode segments of the first planar electrode and, on the other hand, the second planar electrode each have a 180° phase shift. An advantage of the phase shift of adjacent electrode segments also lies in a more uniform distribution of the phases, which, due to the fact that the ground shift of the second planar electrode is not homogeneous but is distributed in a spatially different manner.

In the event that the activated switching regions have very different switching states, it is conceivable in a development of the said first preferred embodiment not to form the said groups from switching regions (or electrode segments) not on the basis of the above-described rules, but to form them in a flexible manner as a function of the switching states and voltage amounts required for this purpose in such a way that the total voltage amount of each group is as similar as possible. This means that the allocation does not take place according to the number of switching regions such that the groups comprise the same or an as similar as possible number of switching regions. Instead, the groups are allocated such that the smallest possible difference between the total voltage amounts of the two groups occurs. For example, several switching regions with a low switching state would be combined to form a group, in order to compensate for a single switching region with a high switching state. A different size of the switching regions can also be taken into account. This allocation can be software-controlled and, even in case of very different switching states (and/or very different sizes) of the individual switching regions, ensures optimum compensation of the ground shift by means of countercurrents of similar strength.

In a second preferred embodiment, all active switching regions are each operated with AC voltage of their own phase (i.e., a phase that is different from the other switching regions). There is for this reason a phase shift between any selected pair of switching regions. The phase shift is selected as a function of the number of active switching regions— and is 360° divided by the number of switching regions or an integer multiple thereof. The ground shift is then avoided because the currents are compensated ideally. This applies at least in those cases in which the switching states of the different switching regions are the same and therefore also the amount of the AC voltages is the same. Otherwise, the currents are only partially compensated, but the ground shift is nevertheless reduced at least significantly. Compensation is ideal in particular if the AC voltage is a sinusoidal voltage.

For this reason, in the said second preferred embodiment an AC voltage with its own phase (i.e., a phase that is different from the other electrode segments) is applied in each case between, on the one hand, n electrode segments of the first planar electrode and, on the other hand, the second planar electrode in order to produce a finite switching state greater than 0%. Again, n is an integer and corresponds to the number of active switching regions. The AC voltages have a phase shift of 360°/n amongst each other or an integer multiple thereof. In other words, no phase occurs several times, i.e., for more than one electrode segment. For each electrode segment, there is exactly one electrode segment with a phase shift of 360°/n a and (if n is greater than 2) exactly one electrode segment with a phase shift of 2*360°/n and (if n is greater than 3) exactly one electrode segment with a phase shift of 3*360°/n, etc. The phase shift $\Delta\phi_i$ of the AC voltage of the i-th electrode segment compared to that of the first active electrode segment is calculated, in general, from $$\Delta\phi_i = \frac{i-1}{n} \times 360°,$$

wherein n is the total number of active segments.

Due to the spatial inhomogeneity of the ground shift, it is advantageous if the phases of adjacent segments are as different as possible. This means that the phase shifts are selected such that the phase shifts of adjacent segments are at a maximum. In a further preferred embodiment, the phase shift $\Delta\phi_i$ of the AC voltage of the i-th electrode segment compared to that of the first active electrode segment is then calculated from $$\Delta\phi_i = \left(\left[\frac{i-1}{2}\right] + (i \bmod 2) \times \left[\frac{n}{2}\right]\right) \times 360°,$$

wherein n is the total number of active segments and i is their numbering in spatial order. Here "mod" means the modulo operation. However, it is also possible in principle for the phase shift of adjacent activated switching regions to be 360°/n in each case, while not directly adjacent switching regions have a phase shift which is a multiple of 360°/n.

The said phase shift of 360°/n is optimal and results in complete compensation of countercurrents. However, a significant improvement can be achieved even with slight deviations from this optimal value. The phase shift is preferably from 330°/n to 390°/n, particularly preferably from 340°/n to 380°/n, very particularly preferably from 350°/n to 370°/n and ideally 360°/n.

In the case of a large number of activated switching regions, it is possible in a development of the said second preferred embodiment to subdivide the activated switching regions into more than two groups, wherein all groups preferably have the same number of switching regions or at least a number which is as similar as possible, so that the number of switching regions of different groups differs by 1 at most. Each group is operated with an AC voltage of the same phase, and the AC voltages of different groups have a phase shift which corresponds to 360° divided by the number of groups or to an integer multiple thereof. Good compensation of the ground shift can also be achieved in this way. In this case, due to the already mentioned spatial inhomogeneity of the ground shift, it is particularly advantageous to select the groups such that their members have an as large as possible spatial distance from one another.

In both preferred embodiments, an optimal effect is achieved if all switching regions have the same size, because the voltage required for a specific switching state also depends on the size and geometry of the switching region. In typical application situations, this is at least approximately the case. It is therefore particularly advantageous if all switching regions have at least approximately the same area, wherein the area of the individual switching regions deviates from the average value of the surfaces of all switching regions by not more than 20%, preferably not more than 10%.

In both preferred embodiments, an optimal effect is also achieved if all switching regions are operated with an AC voltage of the same amplitude, which therefore also represents an advantageous case.

Various functional elements can be used, provided they are operated with AC voltage. In a preferred embodiment, the functional element is a PDLC (polymer-dispersed liquid crystal) functional element. The active layer of a PDLC functional element contains liquid crystals which are embedded in a polymer matrix. If no voltage is applied to the planar electrodes, the liquid crystals will be aligned in a unordered manner, which results in strong scattering of the light passing through the active layer. If a voltage is applied to the planar electrodes, the liquid crystals will align in a common direction and the transmission of light through the active layer is increased. However, other functional elements can also be used, the variability of whose optical properties is based on liquid crystals, for example PNLC (polymer-networked liquid crystal) functional elements.

In a further preferred embodiment, the functional element is an SPD (suspended-particle device) functional element. The active layer contains suspended particles, wherein the absorption of light through the active layer can be changed by applying a voltage to the planar electrodes.

The aforementioned controllable functional elements and their mode of operation are known per se to the person skilled in the art, so that a detailed description can be dispensed with at this point.

In an advantageous embodiment, the functional element comprises two carrier films in addition to the active layer and the planar electrodes, wherein the active layer and the planar electrodes are preferably arranged between the carrier films. The carrier films are preferably made of thermoplastic material, for example based on polyethylene terephthalate (PET), polypropylene, polyvinyl chloride, fluorinated ethylene propylene, polyvinyl fluoride or ethylene tetrafluoroethylene, particularly preferably based on PET. The thickness of the carrier films is preferably from 10 µm to 200 µm. Such functional elements can advantageously be provided, in particular purchased commercially, as multilayer films cut to size and shape and then laminated into the laminated glass pane, preferably via a respective thermoplastic connection layer with the outer pane and the inner pane. It is possible to segment the first planar electrode by laser radiation even when it is incorporated in such a multilayer film. A thin, visually inconspicuous insulation line can be produced by the laser treatment without damaging the carrier film typically lying above it.

The side edge of the functional element can be sealed, for example by merging the carrier layers or by a (preferably polymeric) tape. The active layer can thus be protected, in particular from constituents of the intermediate layer (in particular plasticizers) diffusing into the active layer, which can lead to degradation of the functional element.

For electrical contacting, the planar electrodes or electrode segments are preferably connected to so-called flat or foil conductors, which extend out of the intermediate layer beyond the side edge of the laminated glass pane. Flat conductors have a band-like metallic layer as their conductive core, which layer—except for the contact surfaces—is typically surrounded by a polymeric insulation sheath. Optionally, so-called bus bars, for example strips of an electrically conductive foil (for example copper foil) or electrically conductive printings, can be arranged on the planar electrodes, wherein the flat or foil conductors are connected to the said bus bars. The flat or foil conductors are connected to the control unit either directly or via further conductors.

In an advantageous embodiment, the control unit is fastened to the interior-side surface of the inner pane facing away from the intermediate layer. The control unit can, for example, be affixed directly to the surface of the inner pane. In an advantageous embodiment, the control unit is inserted into a fastening element, which in turn is fastened to the interior-side surface of the inner pane, preferably by means of a layer of an adhesive. Such fastening elements are also known as brackets in the vehicle sector and are typically made of plastic. Electrical connection of the laminated glass pane is facilitated by attaching the control unit directly to the laminated glass pane. In particular, no long cables are required between the control unit and the functional element.

Alternatively, however, it is also possible for the control unit not to be attached to the laminated glass pane, but, for example, integrated in the electrical system of the vehicle or is fastened to the vehicle body if the laminated glass pane is a vehicle window pane. The control unit is preferably arranged in the interior of the vehicle such that it is not visible, for example in the dashboard or behind a paneling.

The laminated glass pane can be equipped with an opaque cover imprintment, in particular in a circumferential edge region, as is common practice in the vehicle sector, in particular for windshields, rear windows and roof panels. The cover imprintment is typically made of an enamel containing glass frits and a pigment, in particular black pigment. The printing ink is typically applied in a screen printing method and is then stoved on. Such a cover imprintment is applied to at least one of the pane surfaces, preferably the interior-side surface of the outer pane and/or inner pane. The cover imprintment preferably surrounds a central see-through region in a frame-like manner and serves in particular to protect the adhesive, by which the laminated glass pane is connected to the vehicle body, against UV radiation. If the control unit is attached to the interior-side surface of the inner pane, it will preferably be attached in the opaque region of the cover imprintment.

The thermoplastic intermediate layer serves to connect the two panes, as is common practice with laminated glass panes. Thermoplastic films are typically used, and the intermediate layer is formed therefrom. In a preferred embodiment, the intermediate layer is formed at least from a first thermoplastic layer and a second thermoplastic layer, between which the functional element is arranged. The functional element is then connected to the outer pane via a region of the first thermoplastic layer and to the inner pane via a region of the second thermoplastic layer. The thermoplastic layers preferably project circumferentially beyond the functional element. Where the thermoplastic layers have direct contact with one another and are not separated from one another by the functional element, they can merge together during lamination in such a way that the original layers may no longer be discernible and instead a homogeneous intermediate layer is present.

A thermoplastic layer can be formed, for example, by a single thermoplastic film. A thermoplastic layer can also be formed from sections of different thermoplastic films, the side edges of which are attached to each other.

In a preferred embodiment, the functional element, more precisely the side edges of the functional element, is surrounded circumferentially by a third thermoplastic layer. The third thermoplastic layer is frame-like with a recess into which the functional element is inserted. The third thermoplastic layer can be formed by a thermoplastic film into which the recess has been introduced by cutting. Alternatively, the third thermoplastic layer can also be composed of a plurality of film sections around the functional element. The intermediate layer is then formed from a total of at least three thermoplastic layers arranged flat on top of each other, wherein the middle layer has a recess in which the functional element is arranged. During production, the third thermoplastic layer is arranged between the first and the second thermoplastic layer, wherein the side edges of all the thermoplastic layers are preferably congruent. The third thermoplastic layer preferably has about the same thickness as the functional element. This compensates for the local thickness difference which is introduced by the locally limited functional element, so that glass breakage during lamination can be avoided and an improved visual appearance result.

The layers of the intermediate layer are preferably formed from the same material, but can in principle also be formed from different materials. The layers or films of the intermediate layer are preferably based on polyvinyl butyral (PVB), ethylene vinyl acetate (EVA), or polyurethane (PU). This means that the layer or film predominantly contains the said material (more than 50% by weight) and can, in addition, optionally contain further constituents, for example plasticizers, stabilizers, UV or IR absorbers. The thickness of each thermoplastic layer is preferably from 0.2 mm to 2 mm, particularly preferably from 0.3 mm to 1 mm. For example, films with standard thicknesses of 0.38 mm or 0.76 mm can be used.

The outer pane and the inner pane are preferably made of glass, particularly preferably of soda lime glass, as is customary for window panes. However, the panes can also be manufactured from other types of glass, for example quartz glass, borosilicate glass or aluminosilicate glass, or from rigid clear plastics, for example polycarbonate or polymethyl methacrylate. The panes can be clear or tinted or colored. Depending on the application, limits can be set to the degree of tinting or coloration: for example, a prescribed light transmission must sometimes be ensured, for example a light transmission of at least 70% in the main vision area A according to Regulation no. 43 of the Economic Commission for Europe of the United Nations (UN/ECE) (ECE-R43, "Uniform provisions concerning the approval of safety glazing materials and their installation on vehicles").

The outer pane, the inner pane and/or the intermediate layer can have suitable coatings known per se, for example anti-reflective coatings, non-stick coatings, anti-scratch coatings, photocatalytic coatings, UV-absorbing or reflective coatings or IR-absorbing or reflecting coatings such as sun protection coatings or low-E coatings.

The thickness of the outer pane and of the inner pane can vary widely and thus be adapted to the requirements in the individual case. The outer pane and the inner pane preferably have thicknesses of 0.5 mm to 5 mm, particularly preferably of 1 mm to 3 mm.

The invention also relates to the use of a glazing unit according to the invention, in particular of the laminated glass pane of a glazing unit according to the invention, in buildings or in means of transportation on land, in the air or in water, preferably as a window pane of a vehicle, in particular of a motor vehicle. The glazing unit can be used, for example, as a windshield, roof panel, rear wall pane or side pane.

In a particularly preferred embodiment, the glazing unit or the laminated glass pane is a windshield of a vehicle. The functional element is preferably used then as an electrically controllable sun screen, which is arranged in an upper region of the windshield, while the majority of the windshield is not provided with the functional element. The switching regions are preferably arranged substantially parallel to the upper edge of the windshield with increasing distance therefrom. As a result of the independently switchable switching regions, the user can determine the extent of the region bordering the upper edge which is to be shaded or provided with high light scattering, depending on the position of the sun, in order to avoid sun dazzle.

In yet another preferred embodiment, the glazing unit or the laminated glass pane is a roof panel of a vehicle. The functional element is then preferably arranged in the entire see-through area of the laminated glass pane. In a typical embodiment, this see-through area comprises the entire laminated glass pane minus a circumferential edge region which is provided with an opaque cover print on at least one of the surfaces of the panes. The functional element extends over the entire see-through area, wherein its side edges are arranged in the region of the opaque cover print and are thus not visible to the observer. The switching regions are preferably arranged substantially parallel to the front edge of the roof panel with increasing distance therefrom. The user can define by means of the independently switchable switching regions which region of the roof panel is to be transparent and which should be shaded or provided with high light scattering, for example as a function of the position of the sun in order to avoid excessive heating of the vehicle interior. It is also possible for each vehicle passenger, i.e., for example, the driver, the front-seat passenger, the passenger in the left-hand back seat and the passenger in the right-hand back seat, to be assigned a switching region located above them.

The invention is explained in more detail with reference to a drawing and exemplary embodiments. The drawing is a schematic representation and is not true to scale. The drawing does not limit the invention in any way. In the drawings.

Figure 1:
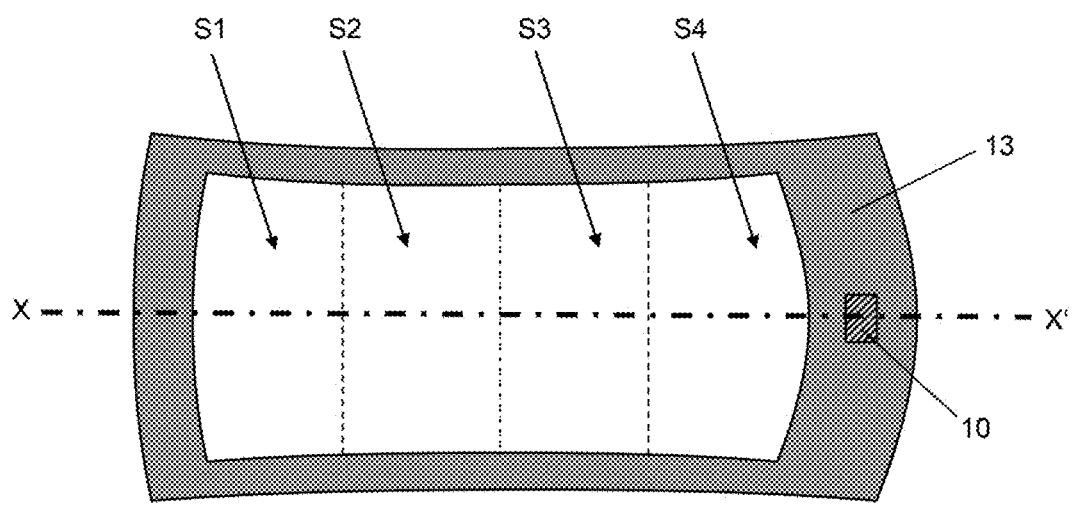
FIG. 1 shows a plan view of an embodiment of the glazing unit according to the invention.

FIG. 1, FIG. 2, FIG. 3 and FIG. 4 show a detail of a glazing unit according to the invention with electrically controllable optical properties comprising a laminated glass pane and a control unit 10. The laminated glass pane is provided, for example, as a roof panel of a passenger vehicle, the light transmission of which can be electrically controlled in regions. The laminated glass pane comprises an outer pane 1 and an inner pane 2, which are connected to one another via an intermediate layer 3. The outer pane 1 and the inner pane 2 consist of soda lime glass, which can optionally be tinted. The outer pane 1 has, for example, a thickness of 2.1 mm, the inner pane 2 has a thickness of 1.6 mm.

The intermediate layer 3 comprises a total of three thermoplastic layers 3a, 3b, 3c which are each formed by a thermoplastic film having a thickness of 0.38 mm made of PVB. The first thermoplastic layer 3a is connected to the outer pane 1, the second thermoplastic layer 3b is connected to the inner pane 2. The third thermoplastic layer 3c located in between has a cutout in which a functional element 4 with electrically controllable optical properties is inserted essentially in a precise fit, i.e., approximately flush on all sides. The third thermoplastic layer 3c thus forms as it were a kind of mount or frame for the approximately 0.4 mm thick functional element 4, which is thus encapsulated by the thermoplastic material and protected thereby. The functional element 4 is, for example, a PDLC multilayer film which can be switched from a clear, transparent state to an opaque, non-transparent (diffuse) state. The functional element 4 is a multilayer film consisting of an active layer 5 between two planar electrodes 8, 9 and two carrier films 6, 7. The active layer 5 contains a polymer matrix with liquid crystals dispersed therein, which align depending on the electrical voltage applied to the planar electrodes 8, 9, whereby the optical properties can be controlled. The carrier films 6, 7 are made of PET and have a thickness of, for example, 0.125 mm. The carrier films 6, 7 are provided with a coating made of ITO with a thickness of about 100 nm that faces the active layer 5, and form the planar electrodes 8, 9. The planar electrodes 8, 9 are connected to electrical cables 14 via bus bars (not shown) (formed, for example, from copper foil strips), which electrical cables produce the electrical connection to the control unit 10.

This control unit 10 is attached, for example, to the interior-side surface of the inner pane 2 facing away from the intermediate layer 3. For this purpose, for example, a fastening element (not shown) is glued to the inner pane 2, into which the control unit 10 is inserted. However, the control unit 10 does not necessarily have to be attached directly to the laminated glass pane. Alternatively, it can be attached, for example, to the dashboard or the vehicle body or can be integrated into the on-board electrical system of the vehicle.

The laminated glass pane has a circumferential edge region which is provided with an opaque cover imprintment 13. The said cover imprintment 13 is typically formed from a black enamel. It is imprinted as printing ink with a black pigment and glass frits in a screen printing method and is burned into the pane surface. The cover imprintment 13 is applied, for example, on the interior-side surface of the outer pane 1 and also on the interior-side surface of the inner pane 2. The side edges of the functional element 4 are covered by this cover imprintment 13. The control unit 10 is arranged in this opaque edge region, i.e., glued onto the cover imprintment 13 of the inner pane 2. The control unit 10 does not interfere there with the view through the laminated glass pane and is visually inconspicuous. In addition, it is at a short distance from the side edge of the laminated glass pane, so that only advantageously short cables 14 are necessary for electrically connecting the functional element 14.

Figure 2:
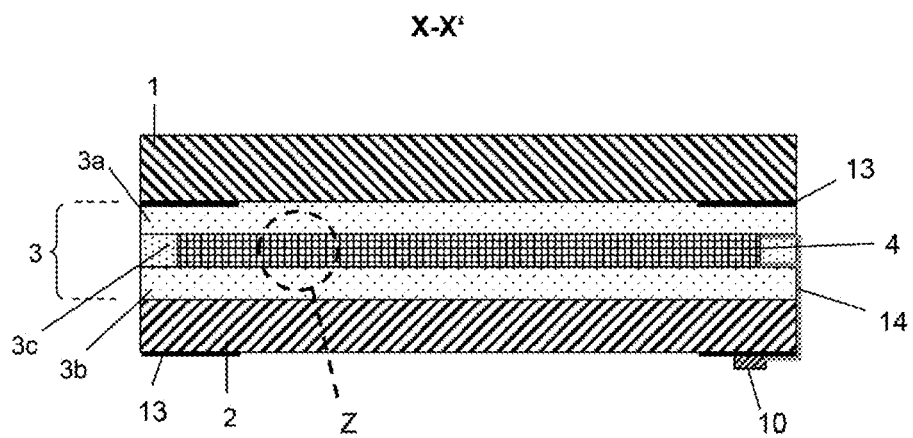
FIG. 2 shows a cross-section through the glazing unit of FIG. 1.
Figure 3:
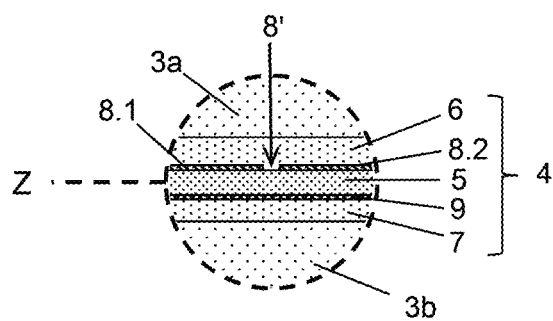
FIG. 3 shows an enlarged representation of the Z region of FIG. 2.

On the other hand, the control unit 10 is connected to the on-board electrical system of the vehicle, which, for the sake of simplicity, is not shown in FIGS. 1 and 2. The control unit 10 is suitable for applying the voltage to the planar electrodes 8, 9 of the functional element 4, which is required for the desired optical state of the functional element 4, depending on a switching signal which the driver specifies for example by pushing a button.

The laminated glass pane has, for example, four independent switching regions S1, S2, S3, S4 in which the switching state of the functional element 4 can be set independently of one another by the control unit 10. The switching regions S1, S2, S3, S4 are arranged one behind the other in the direction from the front edge to the rear edge of the roof panel, wherein the terms "front edge" and "rear edge" relate to the direction of travel of the vehicle. With the switching regions S1, S2, S3, S4, the driver of the vehicle can choose (for example as a function of the position of the sun) to provide only one region of the laminated glass pane instead of the entire laminated glass pane with the diffuse state, while the other regions remain transparent.

In order to form the switching regions S1, S2, S3, S4, the first planar electrode 8 is interrupted by three insulation lines 8', which are arranged substantially parallel to one another and extend from a side edge to the opposite side edge of the functional element 4. The insulation lines 8' are typically introduced into the first planar electrode 8 by laser machining and subdivide the latter into four electrode segments 8.1, 8.2, 8.3 and 8.4 which are materially separated from one another. Each electrode segment 8.1, 8.2, 8.3 and 8.4 is connected to the control unit 10 independently of the others. The control unit is suitable for applying, independently of one another, a voltage between each electrode segment 8.1, 8.2, 8.3 and 8.4 of the first planar electrode 8, on the one hand, and the second planar electrode 9, on the other hand, so that the section of the active layer 5 located in between is subjected to the required voltage in order to achieve a desired switching state.

Figure 4:
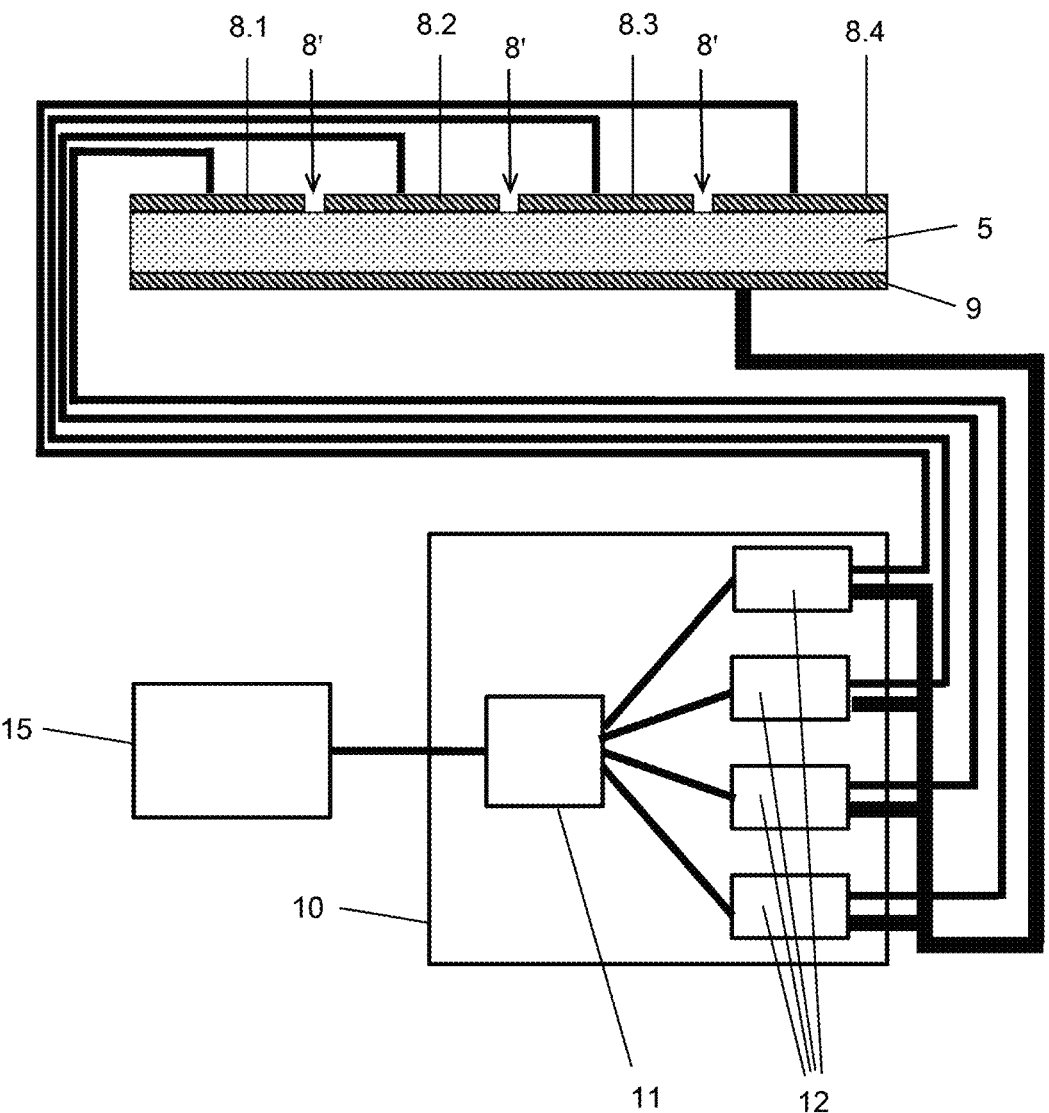
FIG. 4 shows the functional element of the glazing unit of FIG. 1 in an equivalent circuit diagram.

As illustrated in the equivalent circuit diagram of FIG. 4, the control unit 10 is connected to a DC voltage source 15 via the on-board electrical system of the vehicle. The DC voltage source 15 typically provides a DC voltage in the range of 12 V to 14 V (on-board voltage of the vehicle) in the vehicle sector. The control unit 10 is equipped with a DC-DC converter 11, which converts the on-board voltage (primary voltage) into a DC voltage of higher magnitude, for example 65 V (secondary voltage). The secondary voltage must be sufficiently high in order to realize a switching state of the functional element 4 of 100%. The control unit 10 is moreover equipped with four inverters 12 which convert the secondary voltage into an AC voltage. Each inverter 12 is assigned to exactly one electrode segment 8.1, 8.2, 8.3, 8.4 of the first planar electrode 8 and is electrically connected thereto. The second planar electrode 9 is connected to each inverter 12.

Figure 5:
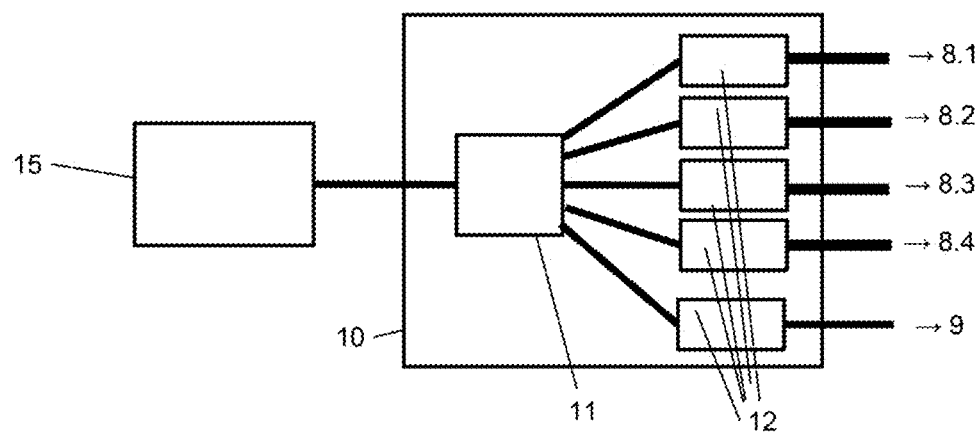
FIG. 5 shows an equivalent circuit diagram of an alternative embodiment of the control unit.

FIG. 5 schematically shows an equivalent circuit diagram of an alternative embodiment of the control unit. In contrast to FIG. 4, the control unit is equipped with five inverters 12. Four of the inverters 12 are each assigned to exactly one electrode segment 8.1, 8.2, 8.3, 8.4 of the first planar electrode 8 and are electrically connected thereto. The second planar electrode 9 is connected to the fifth inverter 12. For the sake of simplicity, the connections to the electrode segments 8.1, 8.2, 8.3, 8.4 and to the second planar electrode 9 are symbolized by arrows; the functional element 4 itself is not shown.

With both control units 10 of FIGS. 4 and 5, the AC voltages, which are required according to the invention and are independent of one another, can be provided for the different switching regions S1, S2, S3, S4. In particular, the reference potential applied to the second planar electrode 9 is kept constant over time. The switching potentials, which are applied independently of one another to the electrode segments 8.1, 8.2, 8.3, 8.4 of the first planar electrode 8, are variable over time. The amount and phase of each switching potential can be set independently, in particular in a purely software-controlled manner, which is easy to implement. The AC voltage for each switching region S1, S2, S3, S4 results as a temporally variable difference between the temporally variable switching potential and the constant reference potential.

Figure 6:
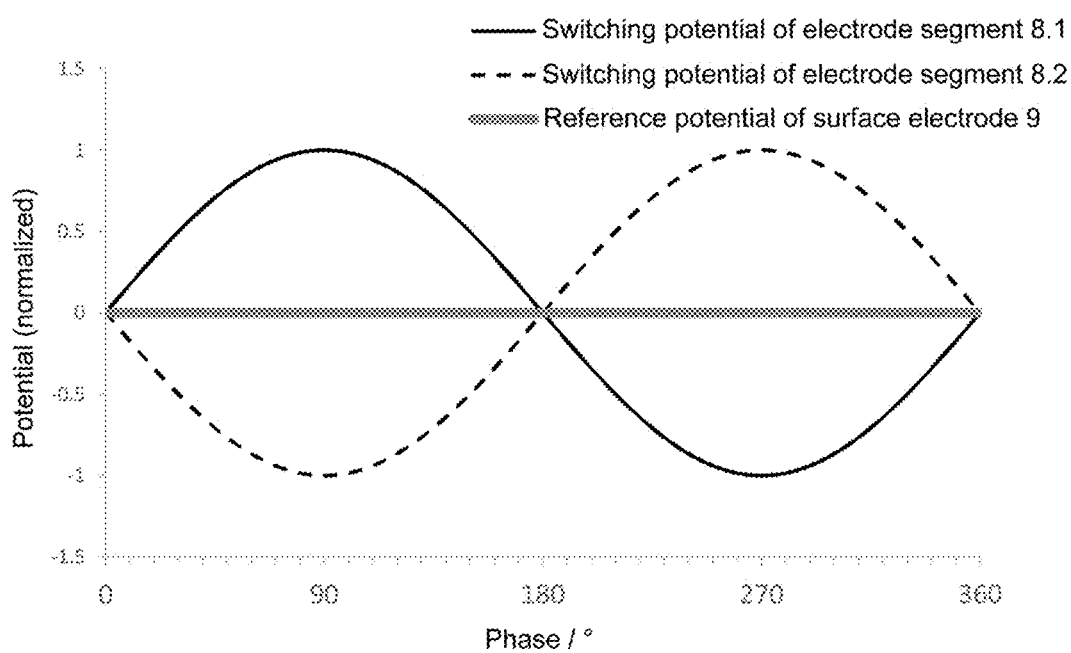
FIG. 6 shows a diagram of exemplary potentials for generating an independent AC voltage in two switching regions.

FIG. 6 shows, by way of example, the electrical potentials for a case in which two switching regions S1, S2 are to be activated, i.e., subjected to an AC voltage, in order to generate a switching state greater than 0%, for example 100%. For this purpose, the associated electrode segments 8.1, 8.2 of the first planar electrode 8 are subjected to a switching potential by the inverter 12 connected to them, which switching potential is modulated over time with a sine function. The amount of the switching potential (amplitude) is selected to be the same and sufficiently high for both electrode segments 8.1, 8.2 in order to produce the maximum change in the optical properties of the active layer 5 between the electrode segments 8.1, 8.2 and the second planar electrode 9 (100% switching state). However, they have a 180° phase shift relative to one another. The reference potential applied to the non-segmented, second planar electrode 9 is constant over time and is 0V. Between each of the electrode segments 8.1, 8.2, on the one hand, and the second planar electrode 9, on the other hand, there is then a sinusoidal AC voltage (sinusoidal voltage), which results as a temporal variable difference between the respective switching potential and the reference potential. The AC voltages have the same amplitude, but a 180° phase shift.

If no "genuine" AC voltage with negative portions is available, it is also possible to select a value greater than 0V for the reference potential in order to oscillate the switching potentials, whereby an effective AC voltage with "relative" positive and negative contributions is realized.

The two other switching regions S3, S4 are not activated; they are therefore intended to have a 0% switching state and therefore be voltage-free. Switching is typically carried out in such a way that the two associated electrode segments 8.3, 8.4 are subjected to a switching potential which corresponds to the nominal reference potential—in this case a potential of 0V which is constant over time. This is advantageous with regard to rapid discharge in the case whereby the switching regions S3, S4 were previously activated. Moreover, it makes the structure more robust to so-called "dirt resistances" caused, in particular, by dust or moisture. All switching regions S1, S2, S3, S4 form a closed circuit with the involvement of all electrode segments 8.1, 8.2, 8.3, 8.4 of the first planar electrode 8 and the second planar electrode 9.

If the activated switching regions S1, S2 are operated in the conventional manner with an AC voltage of the same phase, a rectified electrical current flow would form in each case through the associated section of the active layer 5 between the electrode segments 8.1, 8.2 and the second planar electrode 9. Since the ITO layers acting as planar electrodes 8, 9 have a comparatively high electrical resistance, this current flow would lead to a shift in potential of the second planar electrode 9. This would result in that a certain voltage would be produced in the switching regions S3, S4, which actually should have a voltage-free switching state of 0%, so that a finite switching state greater than 0% would be produced in the relevant switching region S3, S4, which is actually not desired. This is referred to as a communication (crosstalk) between the switching regions S1, S2, S3, S4.

This effect can be prevented by the phase shift of the AC voltage of the activated switching regions S1, S2. As a result of the 180° phase shift, the currents in the switching regions S1, S2 are always reverse, i.e., going in opposite directions. The contributions to the shift in potential of the second planar electrode 9 therefore cancel each other out at any time. Overall, a shift in potential is prevented and the non-activated switching regions S3, S4 remain free of voltage at all times.

Even in case of a higher even number of activated switching regions, the crosstalk can be ideally prevented in this way if the switching regions are subdivided into two groups, wherein the switching regions of the same group are operated with an AC voltage of the same phase, and the AC voltages of the two groups have a 180° phase shift.

Figure 7:
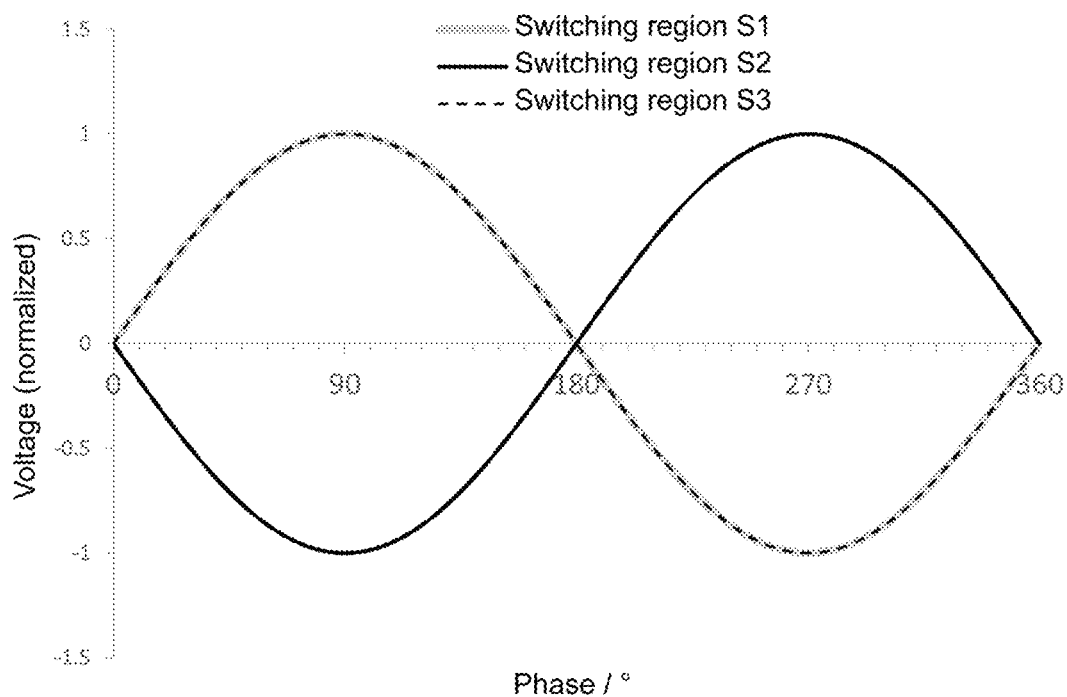
FIG. 7 shows a diagram of exemplary independent AC voltages in three switching regions in an embodiment according to the invention.

FIG. 7 shows, by way of example, sinusoidal voltages for a case in which an odd number of switching regions, namely three switching regions S1, S2, S3, are to be activated, i.e., subjected to an AC voltage, in order to generate a switching state greater than 0%, for example 100%. The two switching regions S1, S3 are operated with an AC voltage of the same phase. The switching region S2 is operated with an AC voltage that is phase-shifted by 180°.

The resulting countercurrents of the switching regions S1, S3 cancel each other out and therefore do not contribute to the shift in potential of the second planar electrode 9. The current flow in the switching region S2 is not compensated and leads to a shift in potential. However, the shift in potential is much less pronounced than if all switching regions S1, S2, S3 were operated with the same phase and the rectified current flows were to add up. In this case, the shift in potential and the associated crosstalk is not completely prevented, but is at least significantly reduced.

Figure 8:
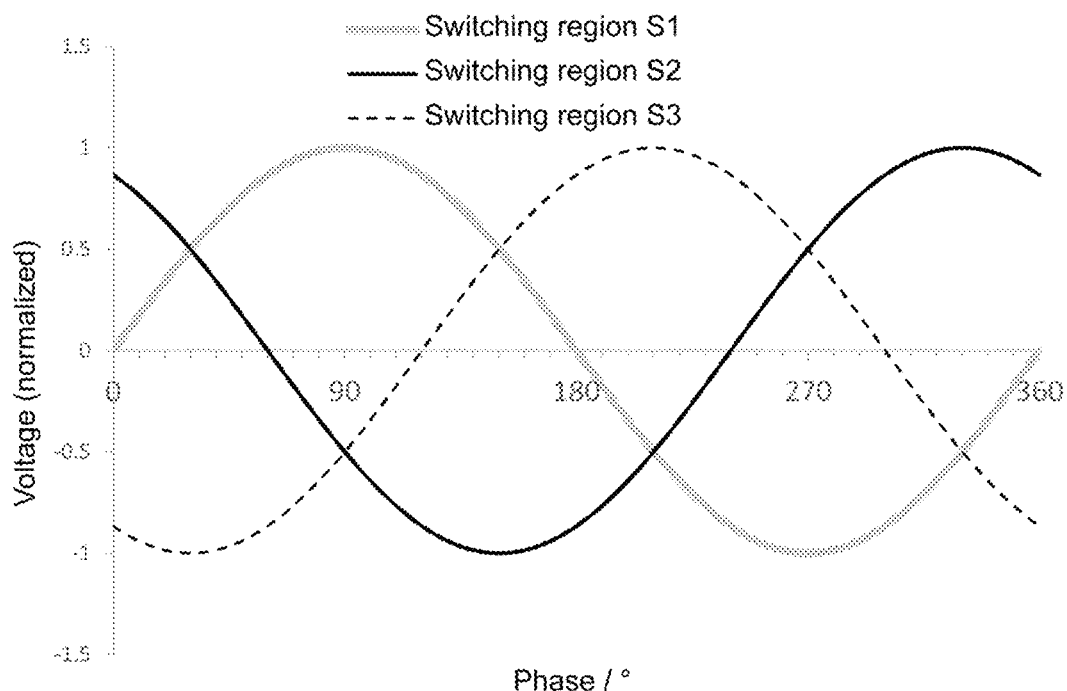
FIG. 8 shows a diagram of exemplary independent AC voltages in three switching regions in a further embodiment according to the invention.

FIG. 8 shows, by way of example, sinusoidal voltages for a case in which an odd number of switching regions, namely three switching regions S1, S2, S3, are to be activated, in a further embodiment. Each switching region S1, S2, S3 is operated with AC voltage of a separate phase that is different from the other switching regions. The phase shifts of the switching regions S1, S2, S3 are not always constant here, but are each determined as a function of the number of activated switching regions. The required phase shift is 360° divided by the number of activated switching regions, i.e., in this case 120°.

All switching regions show a phase shift of 120° or an integer multiple thereof:

The phase shift between the switching regions S1, S2 is 120°.

The phase shift between the switching regions S2, S3 is 120°.

The phase shift between the switching regions S1, S3 is 240°, which in this case corresponds to a phase shift of −120° (i.e., one with an amount of 120° in the opposite direction).

With this embodiment in which the phase shift is selected in each case as a function of the number of activated switching regions and all switching regions are operated in a phase-shifted manner with respect to one another, an ideal compensation of the shift in potential of the second planar electrode 9 can always be achieved, even in case of an odd number of activated switching regions. The crosstalk is prevented in any case.

LIST OF REFERENCE SIGNS (S1, S2, S3, S4) Independent switching regions of the glazing unit
(1) Outer pane
(2) Inner pane
(3) Thermoplastic intermediate layer
(3a) First layer of the intermediate layer 3
(3b) Second layer of the intermediate layer 3
(3c) Third layer of the intermediate layer 3
(4) Functional element with electrically controllable optical properties
(5) Active layer of the functional element 4
(6) First carrier film of the functional element 4
(7) Second carrier film of the functional element 4
(8) First planar electrode of the functional element 4
(8.1, 8.2, 8.3, 8.4) Electrode segments of the first planar electrode 8
(8') Insulation line between two electrode segments 8.1, 8.2, 8.3, 8.4
(9) Second planar electrode of the functional element 4
(10) Control unit
(11) DC-DC converter
(12) Inverter
(13) Cover printing
(14) Electrical cable
(15) DC voltage source
X-X' Cutting line
Y Enlarged region

The invention claimed is:

1. A glazing unit with electrically controllable optical properties having a plurality of independent switching regions, comprising:
a laminated glass pane, comprising
an outer pane and an inner pane, which are connected to one another via a thermoplastic intermediate layer,
an electrically controllable functional element which is arranged between the outer pane and the inner pane and has an active layer having electrically controllable optical properties between a first planar electrode and a second planar electrode,
a control unit adapted to control the optical properties of the electrically controllable functional element,
wherein the first planar electrode is subdivided by at least one insulation line into at least two separate electrode segments,
wherein each electrode segment of the first planar electrode and the second planar electrode are electrically connected to the control unit, so that an AC voltage is applicable independently between each electrode segment of the first planar electrode and the second planar electrode in order to control the optical properties of the section of the active layer located between them,
wherein the control unit is adapted to apply an AC voltage between at least two electrode segments of the first planar electrode, on the one hand, and the second planar electrode, on the other hand, wherein the AC voltages are phase-shifted.

2. The glazing unit according to claim 1, wherein the electrically controllable functional element is a PDLC functional element or an SPD functional element.

3. The glazing unit according to either claim 1, wherein the control unit
is connected to a DC voltage source with a primary voltage,
is optionally equipped with a DC-DC converter which is adapted to convert the primary voltage into a higher secondary voltage, and
is equipped with a plurality of inverters which are adapted to convert the primary voltage or the secondary voltage into an AC voltage.

4. The glazing unit according to claim 3, wherein a number of inverters corresponds to a number of electrode segments of the first planar electrode, and wherein each inverter is connected to exactly one electrode segment of the first planar electrode, on the one hand, and to the second planar electrode, on the other hand.

5. The glazing unit according to claim 3, wherein a number of inverters exceeds a number of electrode segments of the first planar electrode by 1, and wherein each electrode segment of the first planar electrode and the second planar electrode are connected in each case to a separate inverter.

6. The glazing unit according to claim 1, wherein the AC voltage is a sinusoidal voltage.

7. The glazing unit according to claim 1, wherein the first planar electrode is subdivided by at least two insulation lines into at least three separate electrode segments.

8. The glazing unit according to claim 1, wherein the first and second planar electrodes are formed on the basis of indium tin oxide (ITO) or silver.

9. The glazing unit according to claim 1, wherein the at least one insulation line has a width of 5 µm to 500 µm.

10. A method comprising providing a glazing unit according to claim 1 as a window pane of a vehicle.

11. The method according to claim 10, wherein the window pane is a windshield or roof panel.

12. A method for controlling a glazing unit with electrically controllable optical properties having a plurality of independent switching regions,
wherein the glazing unit comprises
a laminated glass pane, comprising
an outer pane and an inner pane, which are connected to one another via a thermoplastic intermediate layer,
an electrically controllable functional element which is arranged between the outer pane and the inner pane and has an active layer having electrically controllable optical properties between a first planar electrode and a second planar electrode,
a control unit adapted to control the optical properties of the electrically controllable functional element,
wherein the first planar electrode is subdivided by at least one insulation line into at least two separate electrode segments,
wherein each electrode segment of the first planar electrode and the second planar electrode are electrically connected to the control unit, so that an AC voltage is applicable independently between each electrode segment of the first planar electrode and the second planar electrode in order to control the optical properties of the section of the active layer located between them,
the method comprising applying an AC voltage between at least two electrode segments of the first planar electrode, on the one hand, and the second planar electrode, on the other hand, wherein the AC voltages are phase-shifted.

13. The method according to claim 12, wherein an AC voltage is applied in each case between n electrode segments of the first planar electrode, on the one hand, and the second planar electrode, on the other hand, wherein n is an integer, and wherein if n is an even number, an AC voltage with a first phase is applied between n/2 electrode segments of the first planar electrode, on the one hand, and the second planar electrode, on the other hand, and an AC voltage with a second phase is applied between n/2 electrode segments of the first planar electrode, on the one hand, and the second planar electrode, on the other hand, and if n is an odd number, an AC voltage with a first phase is applied between (n+1)/2 electrode segments of the first planar electrode, on the one hand, and the second planar electrode, on the other hand, and an AC voltage with a second phase is applied between (n−1)/2 electrode segments of the first planar electrode, on the one hand, and the second planar electrode, on the other hand, and wherein the first phase and the second phase have a 180° phase shift.

14. The method according to claim 13, wherein the AC voltages between directly adjacent electrode segments of the first planar electrode, on the one hand, and the second planar electrode, on the other hand, each have a 180° phase shift.

15. The method according to claim 12, wherein an AC voltage with a separate phase is applied in each case between n electrode segments of the first planar electrode, on the one hand, and the second planar electrode, on the other hand, wherein n is an integer, and wherein the AC voltages have a phase shift of 360°/n amongst each other or an integer multiple thereof.

16. The method according to claim 12, wherein an electrical switching potential which is variable over time is applied to each electrode segment of the first planar electrode and a reference potential which is constant over time is applied to the second planar electrode in order to produce the AC voltage.

* * * * *